United States Patent
Fattal et al.

(10) Patent No.: US 11,143,810 B2
(45) Date of Patent: Oct. 12, 2021

(54) UNILATERAL BACKLIGHT, MULTIVIEW DISPLAY, AND METHOD EMPLOYING SLANTED DIFFRACTION GRATINGS

(71) Applicant: LEIA INC., Menlo Park, CA (US)

(72) Inventors: David A. Fattal, Mountain View, CA (US); Francesco Aieta, Menlo Park, CA (US)

(73) Assignee: LEIA INC., Menlo Park, CA (US)

(*) Notice: Subject to any disclaimer, the term of this patent is extended or adjusted under 35 U.S.C. 154(b) by 0 days.

(21) Appl. No.: 16/584,819

(22) Filed: Sep. 26, 2019

(65) Prior Publication Data

US 2020/0033526 A1 Jan. 30, 2020

Related U.S. Application Data

(63) Continuation of application No. PCT/US2018/020543, filed on Mar. 1, 2018.

(60) Provisional application No. 62/481,625, filed on Apr. 4, 2017.

(51) Int. Cl.
*F21V 8/00* (2006.01)
*G02B 5/18* (2006.01)

(52) U.S. Cl.
CPC .............. *G02B 6/0038* (2013.01); *G02B 5/18* (2013.01); *G02B 5/1819* (2013.01); *G02B 6/0036* (2013.01)

(58) Field of Classification Search
CPC .................. G02B 5/18–1895; G02B 6/0038
See application file for complete search history.

(56) References Cited

U.S. PATENT DOCUMENTS

| 7,527,416 B2 | 5/2009 | Lin |
| 7,633,586 B2 | 12/2009 | Winlow et al. |
| 8,314,993 B2 | 11/2012 | Levola |
(Continued)

FOREIGN PATENT DOCUMENTS

| CN | 101149445 A * | 3/2008 |
| CN | 103576220 A | 2/2014 |
(Continued)

OTHER PUBLICATIONS

International Search Report and Written Opinion (ISRWO) by International Searching Authority (ISA) Korean Intellectual Property Office (KIPO), dated Jun. 15, 2018 (14 pages) for counterpart parent International (PCT) Application No. PCT/US2018/020543.
(Continued)

*Primary Examiner* — Mariceli Santiago
(74) *Attorney, Agent, or Firm* — J. Michael Johnson; Vivek Ganti

(57) ABSTRACT

A unilateral backlight and a unilateral multiview display employ an array of unilateral diffractive elements configured to provide directional light beams having a unilateral direction. A unilateral diffractive element of the unilateral diffractive element array comprises a slanted diffraction grating configured to provide a directional light beam by diffractive scattering of light guided in a light guide. The unilateral multiview display further includes light valves configured to modulate a plurality of directional light beams as multiview image having the unilateral direction.

18 Claims, 5 Drawing Sheets

(56) References Cited

U.S. PATENT DOCUMENTS

| | | | |
|---|---|---|---|
| 8,807,817 B2 * | 8/2014 | Yang | F21S 8/04 |
| | | | 362/606 |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,348,160 B2 | 5/2016 | Hsu | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,827,209 B2 * | 11/2017 | Kostamo | G02B 5/1819 |
| 2006/0262376 A1 | 11/2006 | Mather et al. | |
| 2007/0040780 A1 | 2/2007 | Gass et al. | |
| 2007/0147079 A1 | 6/2007 | Wu et al. | |
| 2008/0112187 A1 | 5/2008 | Katsumata et al. | |
| 2009/0067156 A1 | 3/2009 | Bonnett et al. | |
| 2010/0039366 A1 | 2/2010 | Hardy | |
| 2010/0141868 A1 * | 6/2010 | St. Hilaire | G02B 6/0061 |
| | | | 349/62 |
| 2011/0141395 A1 * | 6/2011 | Yashiro | G02B 6/0036 |
| | | | 349/62 |
| 2014/0085570 A1 | 3/2014 | Kuwata et al. | |
| 2015/0150149 A1 | 5/2015 | Yamashirodani | |
| 2017/0285240 A1 | 10/2017 | Kuittinen et al. | |
| 2018/0011237 A1 | 1/2018 | Fattal | |
| 2018/0156963 A1 | 6/2018 | Fattal | |
| 2018/0188441 A1 | 7/2018 | Fattal | |
| 2018/0188691 A1 | 7/2018 | Fattal | |
| 2018/0196194 A1 | 7/2018 | Fattal | |
| 2018/0299608 A1 | 10/2018 | Fattal et al. | |
| 2019/0018186 A1 | 1/2019 | Fattal | |
| 2019/0025494 A1 | 1/2019 | Fattal et al. | |
| 2019/0155105 A1 | 5/2019 | Aieta et al. | |
| 2020/0005718 A1 * | 1/2020 | Fattal | G02B 6/0036 |
| 2020/0018891 A1 * | 1/2020 | Fattal | G02B 6/005 |
| 2020/0033621 A1 * | 1/2020 | Fattal | G02B 6/0068 |

FOREIGN PATENT DOCUMENTS

| | | | | |
|---|---|---|---|---|
| CN | 104460115 A | * | 3/2015 | G02B 30/00 |
| CN | 104520740 A | * | 4/2015 | G02B 6/0036 |
| JP | 2003215318 A | | 7/2003 | |
| JP | 2009539129 A | | 11/2009 | |
| JP | 2015049376 A | | 3/2015 | |
| TW | 479119 B | | 3/2002 | |
| WO | WO-2007141606 A2 | * | 12/2007 | G02B 6/0058 |
| WO | WO-2015151255 A1 | * | 10/2015 | G02B 6/0035 |
| WO | 2016160048 A1 | | 10/2016 | |
| WO | 2017041073 A1 | | 3/2017 | |
| WO | 2018067381 A1 | | 4/2018 | |
| WO | 2018140063 A1 | | 8/2018 | |
| WO | 2018182917 A1 | | 10/2018 | |
| WO | 2018182991 A1 | | 10/2018 | |
| WO | WO-2018186955 A1 | * | 10/2018 | G02B 27/42 |
| WO | 2019125390 A1 | | 6/2019 | |
| WO | 2019125479 A1 | | 6/2019 | |
| WO | 2018187019 A1 | | 10/2019 | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Kimmel, Jyrki, Studies on Diffractive Mobile Display Backlights, (Thesis for degree of Doctor of Science in Technology), Tampere University of Technology, Publication 1053, 2012, pp. 1-138 (provided in 2 parts: NPL8-1 & NPL8-2).

Levola, et al., Replicated slanted gratings with a high refractive index material for in and outcoupling of light, Optics Express, Optical Society of America (OSA), Mar. 5, 2007, pp. 2067-2074, vol. 15, No. 5.

Luo, Z., et al., Enhancing LCD Optical Efficiency with a Linearly Polarized Backlight and Polarization-preserving Light Guide Plate, Society for Information Display (SID) SID 2014 Digest, Book 2, Session 57, Advanced Backlighting Technology, 2014, pp. 836-838.

Miller, J. Michael, et al., Design and fabrication of binary slanted surface-relief gratings for a planar optical interconnection, Applied Optics, Aug. 10, 1997, pp. 5717-5727, vol. 36, No. 23.

\* cited by examiner

UNILATERAL BACKLIGHT, MULTIVIEW DISPLAY, AND METHOD EMPLOYING SLANTED DIFFRACTION GRATINGS

CROSS-REFERENCE TO RELATED APPLICATIONS

This application is a continuation patent application of and claims the benefit of priority to International Application No. PCT/US2018/020543, filed Mar. 1, 2018, which claims priority to U.S. Provisional Patent Application Ser. No. 62/481,625, filed Apr. 4, 2017, the entirety of each of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide unilateral backlighting as well as a unilateral multiview display and a dual-mode display that employ unilateral backlighting. In particular, embodiments consistent with the principles described herein provide a unilateral backlight employing unilateral diffractive elements comprising slanted diffraction gratings. The unilateral diffractive elements are configured to scatter light out of the unilateral backlight as directional light beams having a unilateral direction. That is, the slanted diffraction gratings of the unilateral diffractive elements preferentially direct or scatter the light out of only one side of the backlight, according to various embodiments. In some embodiments, the unilateral diffractive elements may be serve as unilateral multibeam elements configured to scatter out the light as a plurality of directional light beams having different principal angular directions in the unilateral or 'one side' direction. The plurality of directional light beams may have directions corresponding to various view directions of a multilateral multiview display, for example.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. Uses of unilateral backlighting and unilateral multiview displays described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Figure 1A:
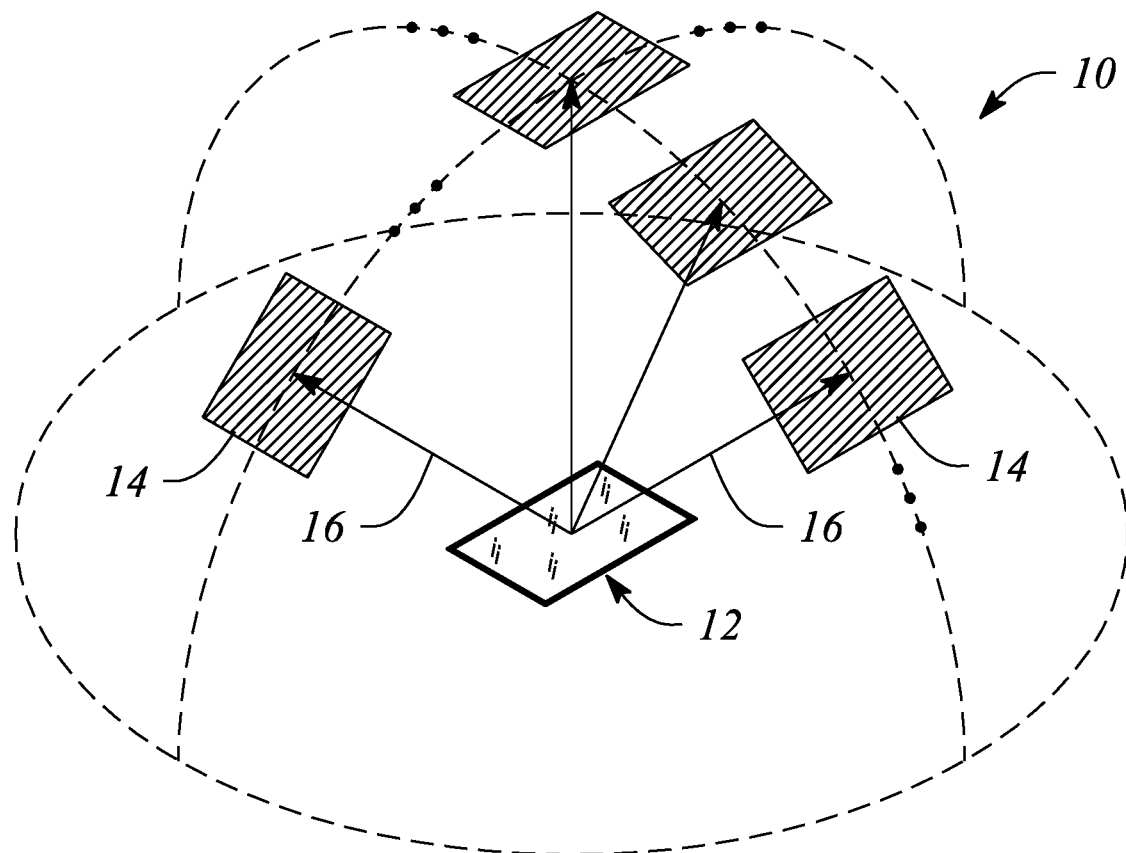
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. A 2D display may be substantially similar to the multiview display 10, except that the 2D Display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
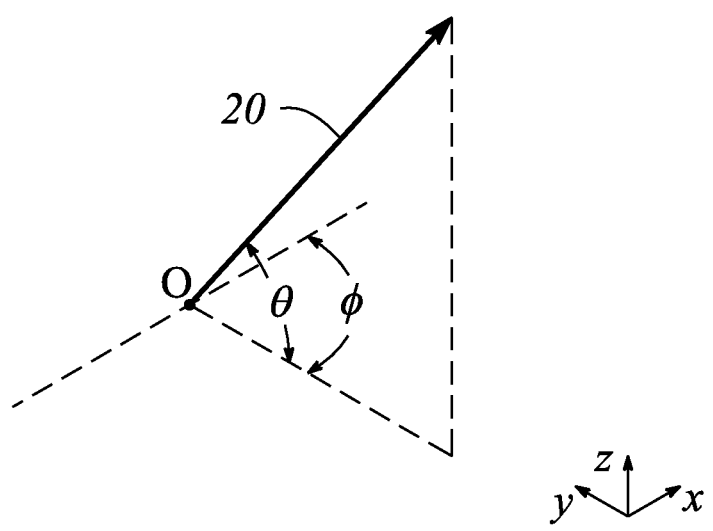
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each view of a plurality of different views of a multiview display. In particular, a multiview pixel may have an individual pixel corresponding to or representing a view pixel in each of the different views of the multiview image. Moreover, the pixels of the multiview pixel are so-called 'directional pixels' in that each of the pixels is associated with a predetermined view direction of a corresponding one of the different views, by definition herein. Further, according to various examples and embodiments, the different view pixels represented by the pixels of a multiview pixel may have equivalent or at least substantially similar locations or coordinates in each of the different views. For example, a first multiview pixel may have individual pixels corresponding to view pixels located at $\{x_1, y_1\}$ in each of the different views of a multiview image, while a second multiview pixel may have individual pixels corresponding to view pixels located at $\{x_2, y_2\}$ in each of the different views, and so on.

In some embodiments, a number of pixels in a multiview pixel may be equal to a number of different views of the multiview display. For example, the multiview pixel may provide sixty-four (64) pixels in associated with a multiview display having 64 different views. In another example, the multiview display may provide an eight by four array of views (i.e., 32 views) and the multiview pixel may include thirty-two 32 pixels (i.e., one for each view). Additionally, each different pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 6409×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = \alpha \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread a (e.g., $\sigma_s \approx \sigma$). A uniform diffraction grating (i.e., a diffraction grating having a substantially uniform or constant diffractive feature spacing or grating pitch) is an example of an angle-preserving scattering feature. In contrast, a Lambertian scatterer or a Lambertian reflector as well as a general diffuser (e.g., having or approximating Lambertian scattering) are not angle-preserving scatterers, by definition herein.

Herein, a 'polarization-preserving scattering feature' or equivalently a 'polarization-preserving scatterer' is any feature or scatterer configured to scatter light in a manner that substantially preserves in scattered light a polarization or at least a degree of polarization of the light incident on the feature or scatterer. Accordingly, a 'polarization-preserving scattering feature' is any feature or scatterer where a degree of polarization of a light incident on the feature or scatterer is substantially equal to the degree of polarization of the scattered light. Further, by definition, 'polarization-preserving scattering' is scattering (e.g., of guided light) that preserves or substantially preserves a predetermined polarization of the light being scattered. The light being scattered may be polarized light provided by a polarized light source, for example.

Herein, the term 'unilateral' as in 'unilateral backlight,' 'unilateral diffractive scattering element,' and 'unilateral multibeam element,' is defined as meaning 'one-sided' or 'preferentially in one direction' correspond to a first side as opposed to another direction correspond to a second side. In particular, a 'unilateral backlight' is defined as a backlight that emits light from a first side and not from a second side opposite the first side. For example, a unilateral backlight may emit light into a first (e.g., positive) half-space, but not into the corresponding second (e.g., negative) half-space. The first half-space may be above the unilateral backlight and the second half-space may be below the unilateral backlight. As such, the unilateral backlight may emit light into a region or toward a direction that is above the unilateral backlight and emit little or no light into another region or toward another direction that is below the unilateral backlight, for example. Similarly a 'unilateral scatterer' such as, but not limited to, a unilateral diffractive scattering element or a unilateral multibeam element is configured to scatter light toward and out of a first surface, but not a second surface opposite the first surface, by definition herein.

Herein, a 'diffraction grating' is broadly defined as a plurality of features (i.e., diffractive features) arranged to provide diffraction of light incident on the diffraction grating. In some examples, the plurality of features may be arranged in a periodic manner or a quasi-periodic manner. In other examples, the diffraction grating may be a mixed-period diffraction grating that includes a plurality of diffraction gratings, each diffraction grating of the plurality having a different periodic arrangement of features. Further, the diffraction grating may include a plurality of features (e.g., a plurality of grooves or ridges in a material surface) arranged in a one-dimensional (1D) array. Alternatively, the diffraction grating may comprise a two-dimensional (2D) array of features or an array of features that are defined in two dimensions. The diffraction grating may be a 2D array of bumps on or holes in a material surface, for example. In some examples, the diffraction grating may be substantially periodic in a first direction or dimension and substantially aperiodic (e.g., constant, random, etc.) in another direction across or along the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a diffractive element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin \theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer (i.e., m=±1, ±2, ... ). A diffraction angle $\theta_m$ of a light beam produced by the diffraction grating may be given by equation (1). First-order diffraction or more specifically a first-order diffraction angle $\theta_m$ is provided when the diffraction order m is equal to one (i.e., m=1).

Figure 2A:
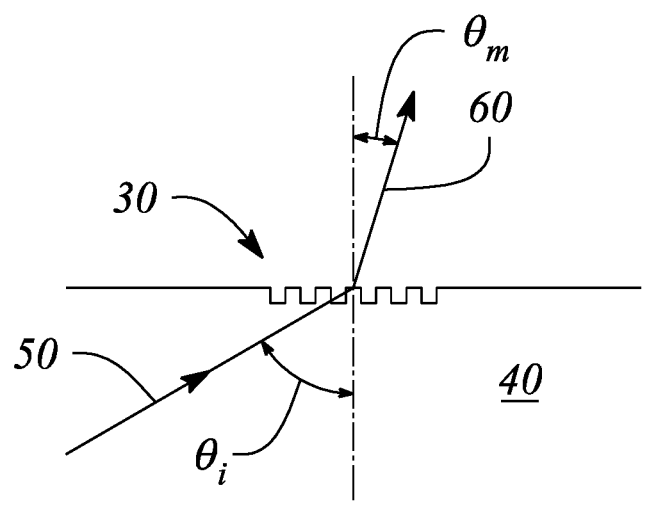
FIG. 2A illustrates a cross-sectional view of a diffraction grating in an example, according to an embodiment consistent with the principles described herein.

FIG. 2A illustrates a cross sectional view of a diffraction grating 30 in an example, according to an embodiment consistent with the principles described herein. For example, the diffraction grating 30 may be located on a surface of a light guide 40. In addition, FIG. 2A illustrates a light beam 50 incident on the diffraction grating 30 at an incident angle $\theta_i$. The incident light beam 50 may be a beam of guided light (i.e., a guided light beam) within the light guide 40. Also illustrated in FIG. 2A is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example diffraction order m=1 (i.e., a first diffraction order).

Herein by definition, a 'slanted' diffraction grating is a diffraction grating with diffractive features having a slant angle relative to a surface normal of a surface of the diffraction grating. According to various embodiments, a slanted diffraction grating may provide unilateral scattering by diffraction of incident light.

Figure 2B:
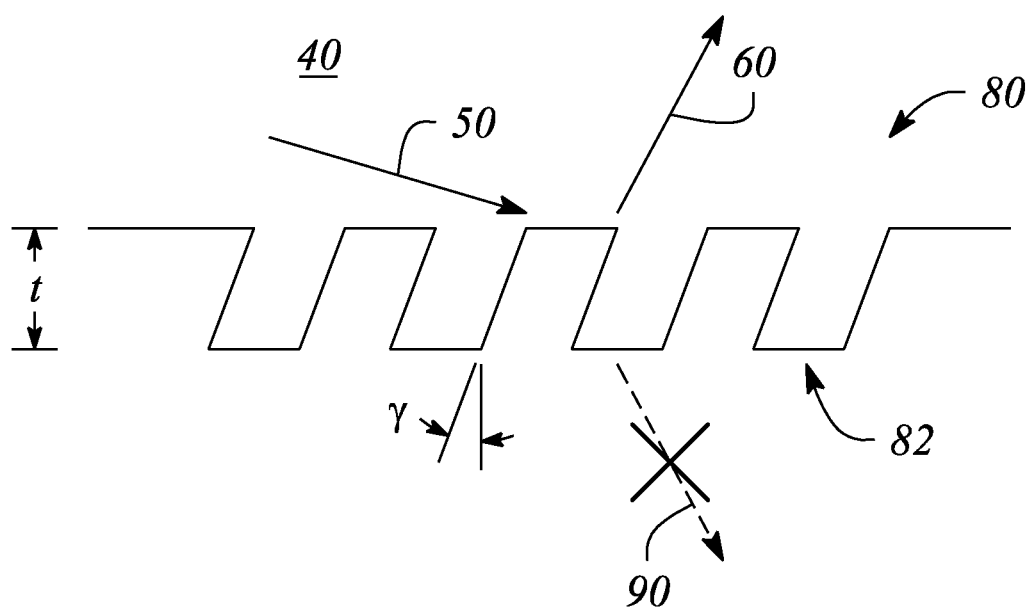
FIG. 2B illustrates a cross-sectional view of a slanted diffraction grating in an example, according to an embodiment consistent with the principles described herein.

FIG. 2B illustrates a cross-sectional view of a slanted diffraction grating 80 in an example, according to an embodiment consistent with the principles described herein. As illustrated, the slanted diffraction grating 80 is a binary diffraction grating located at a surface of a light guide 40, analogous to the diffraction grating 30 illustrated in FIG. 2A. However, the slanted diffraction grating 80 illustrated in FIG. 2B comprises diffractive features 82 having a slant angle $\gamma$ relative to a surface normal (illustrated by a dashed line) along with a grating height, depth or thickness t, as illustrated. Also illustrated are the incident light beam 50 and a directional light beam 60 representing unilateral diffractive scattering of the incident light beam 50 by the slanted diffraction grating 80. Note that diffractive scattering of light in a secondary direction by the slanted diffraction grating 80 is suppressed by the unilateral diffractive scattering, according to various embodiments. In FIG. 2B, a 'crossed out' dashed-line arrow 90 represents suppressed diffractive scattering in the secondary direction by the slanted diffraction grating 80.

According to various embodiments, the slant angle $\gamma$ of the diffractive features 82 may be selected to control a unilateral diffraction characteristic of the slanted diffraction grating 80 including a degree to which diffractive scattering in the secondary direction is suppressed. For example, the slant angle $\gamma$ may be selected to be between about twenty degrees (20°) and about sixty degrees (60°) or between about thirty degrees (30°) and about fifty degrees (50°) or between about forty degrees (40°) and about fifty-five degrees) (55°). A slant angle $\gamma$ in a range of about 30°-60° may provide better than about forty times (40×) suppression of the diffractive scattering in secondary direction, when compared to a unilateral direction provided by the slanted diffraction grating 80, for example. According to some embodiments, the thickness t of the diffractive features 82 may be between about one hundred nanometers (100 nm) and about four hundred nanometers (400 nm). For example, the thickness t may be between about one hundred fifty nanometers (150 nm) and about three hundred nanometers (300 nm) for grating periodicities p in a range from about 300 nm and about five hundred nanometers (500 nm).

Further, the diffractive features may be curved and may also have a predetermined orientation (e.g., a rotation) relative to a propagation direction of light, according to some embodiments. One or both of the curve of the diffractive features and the orientation of the diffractive features may be configured to control a direction of light coupled-out by the diffraction grating, for example. For example, a principal angular direction of the coupled-out light may be a function of an angle of the diffractive feature at a point at which the light is incident on the diffraction grating relative to a propagation direction of the incident light.

By definition herein, a 'multibeam element' is a structure or element of a backlight or a display that produces light that includes a plurality of light beams. A 'diffractive' multibeam element is a multibeam element that produces the plurality of light beams by or using diffractive coupling, by definition. In particular, in some embodiments, the diffractive multibeam element may be optically coupled to a light guide of a backlight to provide the plurality of light beams by diffractively coupling out a portion of light guided in the light guide. Further, by definition herein, a diffractive multibeam element comprises a plurality of diffraction gratings within a boundary or extent of the multibeam element. The light beams of the plurality of light beams (or 'light beam plurality') produced by a multibeam element have different principal angular directions from one another, by definition herein. In particular, by definition, a light beam of the light beam plurality has a predetermined principal angular direction that is different from another light beam of the light beam plurality. According to various embodiments, the spacing or grating pitch of diffractive features in the diffraction gratings of the diffractive multibeam element may be sub-wavelength (i.e., less than a wavelength of the guided light).

According to various embodiments, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various light beams in the light beam plurality are determined by a characteristic including, but not limited to, a size (e.g., one or more of length, width, area, and etc.) of the diffractive multibeam element along with a 'grating pitch' or a diffractive feature spacing and an orientation of a diffraction grating within diffractive multibeam element. In some embodiments, the diffractive multibeam element may be considered an 'extended point light source', i.e., a plurality of point light sources distributed across an extent of the diffractive multibeam element, by definition herein. Further, a light beam produced by the diffractive multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, a diffraction grating, a tapered light guide, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or similar collimating characteristic in one or both of two orthogonal directions that provides light collimation, according to some embodiments.

Herein, a 'collimation factor,' denoted a, is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein, the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., $>\pm20°$). In other embodiments, the broad-angle emitted light cone angle may be greater than about thirty degrees (e.g., $>\pm30°$), or greater than about forty degrees (e.g., $>\pm40°$), or greater than fifty degrees (e.g., $>\pm50°$). For example, the cone angle of the broad-angle emitted light may be about sixty degrees (e.g., $>\pm60°$).

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light provided by a backlight, for example, may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'an element' means one or more elements and as such, 'the element' means 'the element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
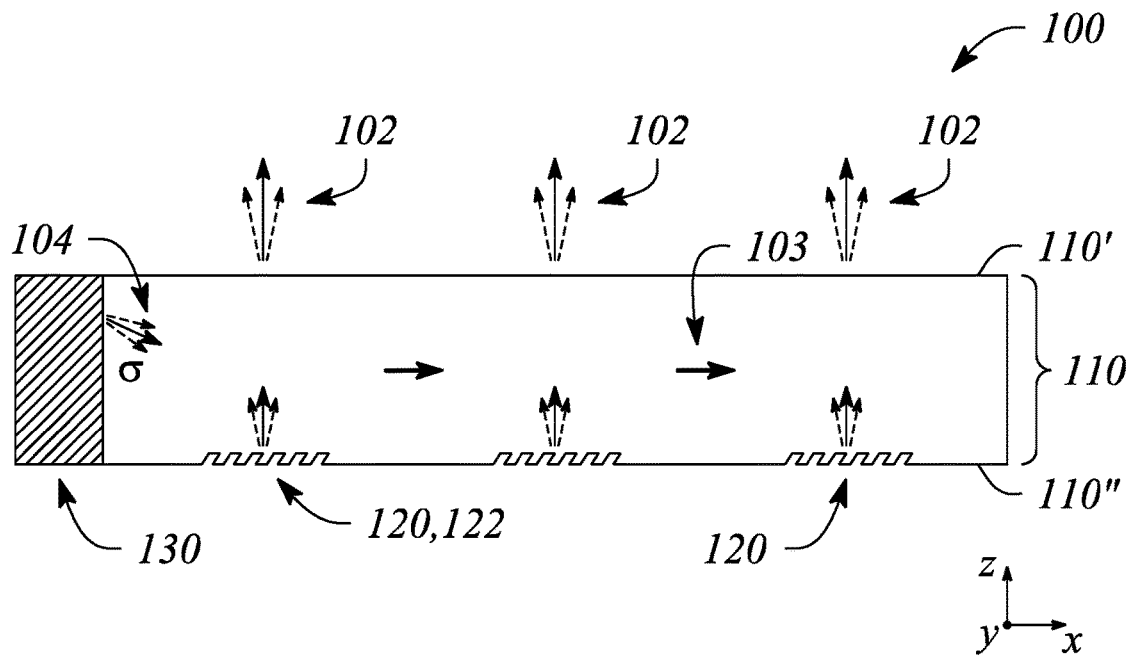
FIG. 3 illustrates a cross-sectional view of a unilateral backlight in an example, according to an embodiment consistent with the principles described herein.

According to some embodiments of the principles described herein, a unilateral backlight is provided. FIG. 3 illustrates a cross-sectional view of a unilateral backlight 100 in an example, according to an embodiment consistent with the principles described herein. As illustrated, the unilateral backlight is configured to provide emitted light as directional light beams 102 having a unilateral direction. In FIG. 3, the unilateral direction of the directional light beams 102 is a direction corresponding to a half-space above a surface of the unilateral backlight 100.

The unilateral backlight 100 illustrated in FIG. 3 comprises a light guide 110. The light guide 110 may be a plate light guide, according to some embodiments. The light guide 110 is configured to guide light along a length of the light guide 110 as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In particular, the light guide 110 may be a slab or plate optical waveguide comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., 'front' surface or side) and a second surface 110" (e.g., 'back' surface or side) of the light guide 110. In particular, the guided light 104 propagates by reflecting or 'bouncing' between the first surface 110' and the second surface 110" of the light guide 110 at the non-zero propagation angle. In some embodiments, the guided light 104 comprises a plurality of guided light beams of different colors of light. The light beams of the plurality of guided light beams may be guided by the light guide 110 at respective ones of different color-specific, non-zero propagation angles. Note that the non-zero propagation angle is not illustrated for simplicity of illustration. However, a bold arrow depicting a propagation direction 103 illustrates a general propagation direction of the guided light 104 along the light guide length in FIG. 3.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten degrees (10°) and about fifty degrees (50°) or, in some examples, between about twenty degrees (20°) and about forty degrees (40°), or between about twenty-five degrees (25°) and about thirty-five degrees (35°). For example, the non-zero propagation angle may be about thirty degrees (30°). In other examples, the non-zero propagation angle may be about 20°, or about 25°, or about 35°. Moreover, a specific non-zero propagation angle may be chosen (e.g., arbitrarily) for a particular implementation as long as the specific non-zero propagation angle is chosen to be less than the critical angle of total internal reflection within the light guide 110.

The guided light 104 in the light guide 110 may be introduced or coupled into the light guide 110 at the non-zero propagation angle (e.g., about 30-35 degrees). One or more of a lens, a mirror or similar reflector (e.g., a tilted collimating reflector), a diffraction grating, and a prism (not illustrated) may facilitate coupling light into an input end of the light guide 110 as the guided light 104 at the non-zero propagation angle, for example. Once coupled into the light guide 110, the guided light 104 propagates along the light guide 110 in a direction that may be generally away from the input end (e.g., illustrated by bold arrows pointing along an x-axis in FIG. 3).

Further, the guided light 104 may be collimated, according to various embodiments. Herein, a 'collimated light' or 'collimated light beam' is generally defined as a beam of light in which rays of the light beam are substantially parallel to one another within the light beam (e.g., the guided light 104). Further, rays of light that diverge or are scattered from the collimated light beam are not considered to be part of the collimated light beam, by definition herein. In some embodiments, the unilateral backlight 100 may include a collimator, such as, but not limited to, a lens, reflector or mirror, a diffraction grating, or a tapered light guide, configured to collimate the light, e.g., from a light source. In some embodiments, the light source comprises a collimator. The collimated light provided to the light guide 110 is a collimated guided light 104. The guided light 104 may be collimated according to or having a collimation factor σ, in various embodiments.

As illustrated in FIG. 3, the unilateral backlight 100 further comprises an array of unilateral diffractive elements 120 spaced apart from one another along the light guide length. In particular, the unilateral diffractive elements 120 of the array are separated from one another by a finite space and represent individual, distinct elements along the light guide length. That is, by definition herein, the unilateral diffractive elements 120 are spaced apart from one another according to a finite (i.e., non-zero) inter-element distance (e.g., a finite center-to-center distance). Further, the unilateral diffractive elements 120 of the plurality generally do not intersect, overlap or otherwise touch one another, according to some embodiments. Thus, each unilateral diffractive element 120 of the unilateral diffractive element array is generally distinct and separated from other ones of the unilateral diffractive elements 120.

According to some embodiments, the unilateral diffractive elements 120 of unilateral diffractive element array may be arranged in either a one-dimensional (1D) array or a two-dimensional (2D) array. For example, the unilateral diffractive elements 120 may be arranged as a linear 1D array. In another example, the unilateral diffractive elements 120 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the unilateral diffractive elements 120 may be substantially uniform or constant across the array. In other examples, the inter-element distance between the unilateral diffractive elements 120 may be varied one or both of across the array and along the length of the light guide 110.

According to various embodiments, a unilateral diffractive element 120 of the array of unilateral diffractive elements 120 comprises a slanted diffraction grating 122. All of the unilateral diffractive elements 120 may be or comprise slanted diffraction gratings 122, according to some embodiments (e.g., as illustrated). The unilateral diffractive element 120 comprising the slanted diffraction grating 122 is configured to scatter out from the light guide 110 a portion of the guided light 104 as the directional light beam 102 having the unilateral direction. In particular, the portion of the guided light 104 is scattered out by the plurality of unilateral diffractive elements 120 by diffractive scattering, according to various embodiments. FIG. 3 illustrates the directional light beams 102 being emitted from the first surface 110' of the light guide 110, in the unilateral direction corresponding to a half-space above the first surface 110', for example.

In some embodiments, the slanted diffraction grating 122 of the unilateral diffractive element 120 may be substantially similar to the slanted diffraction grating 80 illustrated in FIG. 2B. For example, a slant angle of the slanted diffraction grating 122, corresponding to the slant angle γ illustrated in FIG. 2B, may be between about thirty degrees (30°) and about fifty degrees (50°) relative a surface normal of the light guide 110, in some embodiments. Further, the slanted diffraction grating 122 may comprise a plurality of sub-gratings, each sub-grating being a slanted diffraction grating, in some embodiments (not illustrated).

In some embodiments, the unilateral diffractive element may be configured to scatter out the portion of the guided light 104 as a plurality of directional light beams 102 having different principal angular directions in the unilateral direction. Further, the different principal angular directions of the directional light beam plurality may correspond to respective view directions of a unilateral multiview display, in some embodiments. In particular, the unilateral diffractive element 120 comprising the slanted diffraction grating may be a multibeam element and therefore may be referred to as a unilateral multibeam element. In some embodiments, a size of the unilateral diffractive element is comparable to a size of a pixel (or equivalently a size of a light valve) in a multiview pixel of the unilateral multiview display.

Figure 4A:
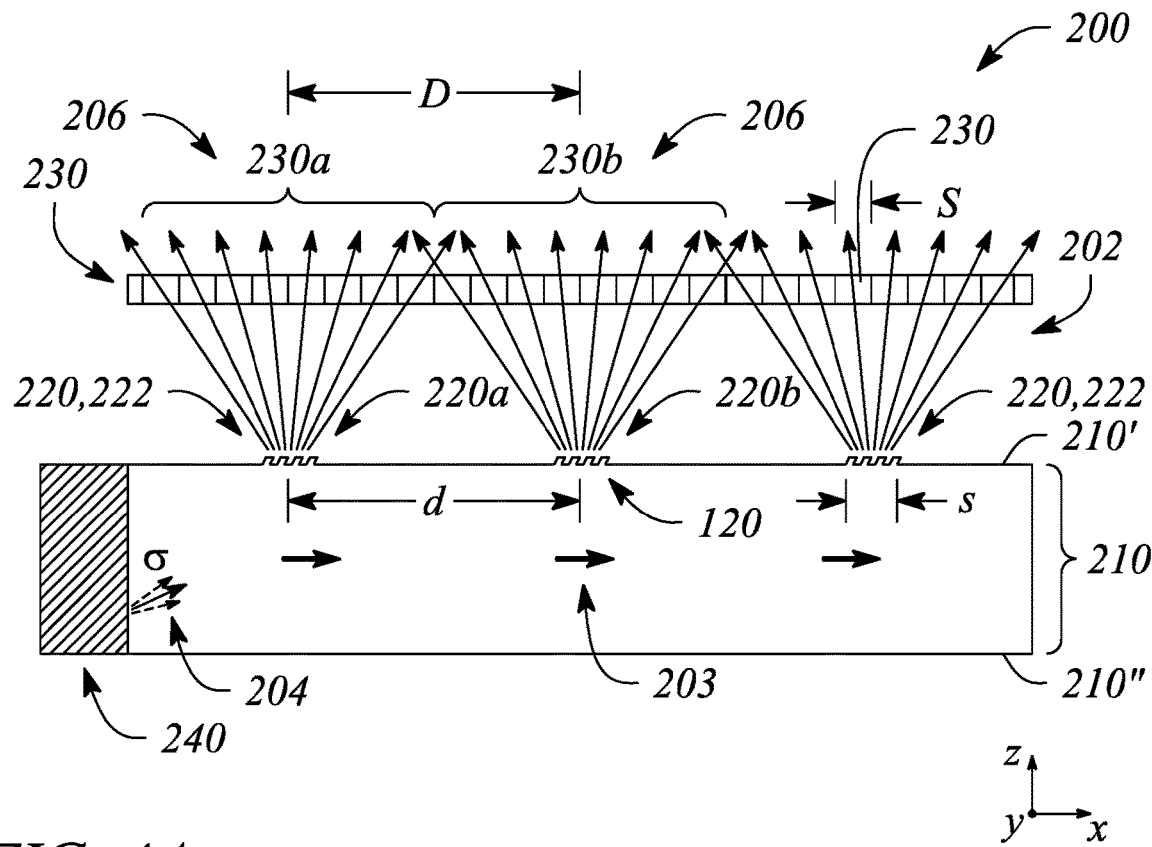
FIG. 4A illustrates a cross-sectional view of a unilateral multiview display in an example, according to an embodiment consistent with the principles described herein.
Figure 4B:
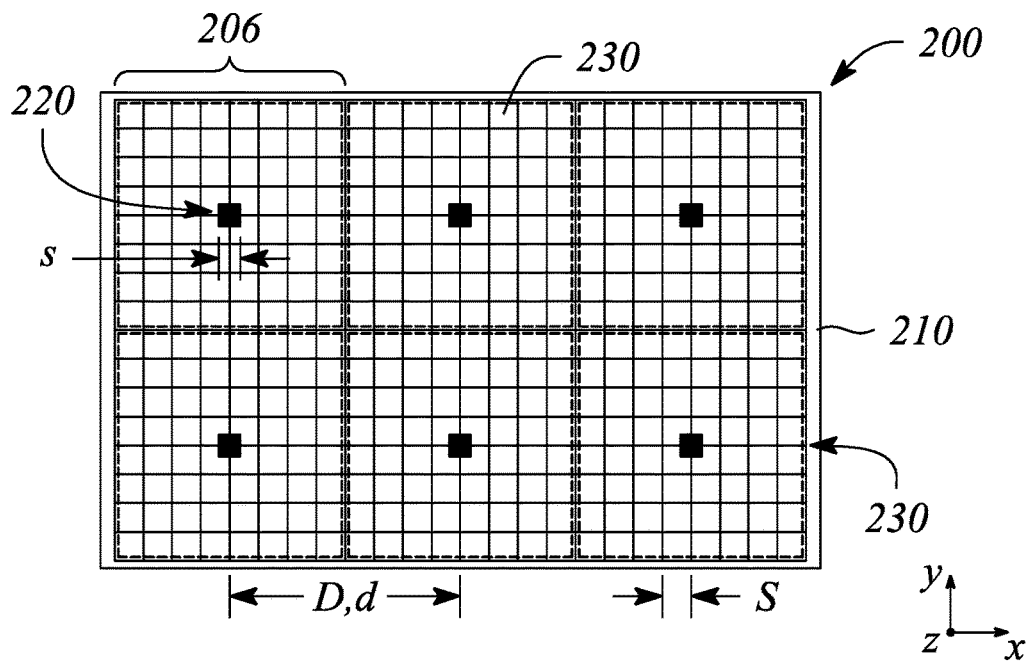
FIG. 4B illustrates a plan view of a unilateral multiview display in an example, according to an embodiment consistent with the principles described herein.
Figure 4C:
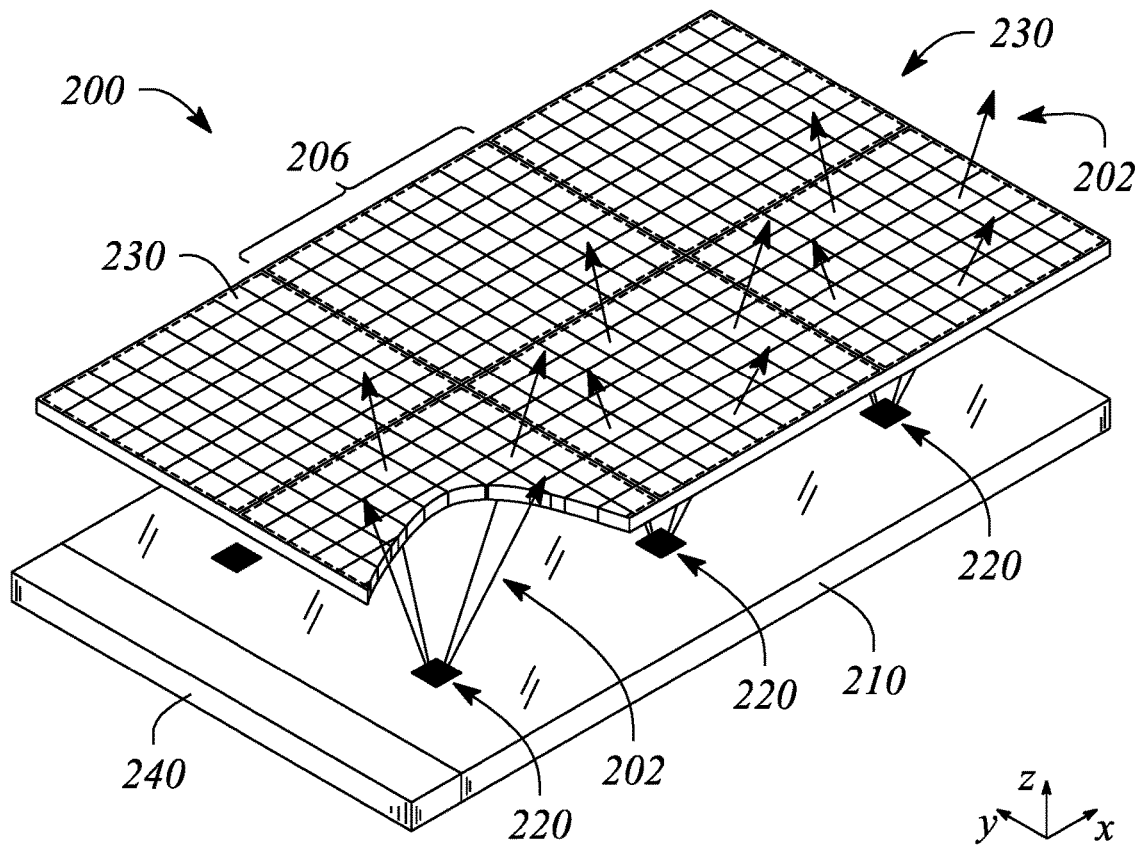
FIG. 4C illustrates a perspective view of a unilateral multiview display in an example, according to an embodiment consistent with the principles described herein.

FIG. 4A illustrates a cross-sectional view of a unilateral multiview display 200 in an example, according to an embodiment consistent with the principles described herein. FIG. 4B illustrates a plan view of a unilateral multiview display 200 in an example, according to an embodiment consistent with the principles described herein. FIG. 4C illustrates a perspective view of a unilateral multiview display 200 in an example, according to an embodiment consistent with the principles described herein. The perspective view in FIG. 4C is illustrated with a partial cut-away to facilitate discussion herein only. The unilateral multiview display 200 illustrated in FIGS. 4A-4C is configured to provide a plurality of directional light beams 202 having different principal angular directions from one another (e.g., as a light field). In some embodiments, directional light beams 202 of the directional light beam plurality may be modulated (e.g., using light valves described below to facilitate the display of information having three-dimensional (3D) content.

As illustrated in FIGS. 4A-4C, the unilateral multiview display 200 comprises a light guide 210 and an array of unilateral diffractive elements 220 spaced apart from on another along a length of the light guide 210. According to various embodiments, the light guide 210 is configured to guide light along the light guide length as guided light 204. Unilateral diffractive elements 220 (or equivalently unilateral multibeam elements) of the unilateral diffractive element array are configured to provide the plurality of directional light beams 202 having different principal angular directions corresponding to respective different view directions of the unilateral multiview display 200, according to various embodiments. In some embodiments, the array of unilateral diffractive elements 220 may be substantially similar to the array of unilateral diffractive elements 120, described above with respect to the unilateral backlight 100.

In particular, a unilateral diffractive element 220 of the unilateral diffractive element array comprises a slanted diffraction grating 222 that may be substantially similar to the slanted diffraction grating 122, described above. Further, the light guide 210 and the array of unilateral diffractive elements 220 of the unilateral multiview display 200, when combined, may be substantially similar to the above-described unilateral backlight 100, in some embodiments.

FIGS. 4A and 4C illustrate the directional light beams 202 as a plurality of diverging arrows depicted as being directed way from a first (or front) surface 210' of the light guide 210. Further, according to various embodiments, a size of the unilateral diffractive element 220 is comparable to a size of a pixel in a multiview pixel 206 of a multiview display, as defined mentioned and further described below. Herein, the 'size' may be defined in any of a variety of manners to include, but not be limited to, a length, a width or an area. For example, the size of a pixel may be a length thereof and the comparable size of the unilateral diffractive element 220 may also be a length of the unilateral diffractive element 220. In another example, the size may refer to an area such that an area of the unilateral diffractive element 220 may be comparable to an area of the pixel.

In some embodiments, the size of the unilateral diffractive element 220 is comparable to the pixel size such that the unilateral diffractive element size is between about fifty percent (50%) and about two hundred percent (200%) of the pixel size. For example, if the unilateral diffractive element size is denoted 's' and the pixel size is denoted 'S' (e.g., as illustrated in FIG. 4A), then the unilateral diffractive element size s may be given by $$\tfrac{1}{2}S \le s \le 2S$$

In other examples, the unilateral diffractive element size is in a range that is greater than about sixty percent (60%) of the pixel size, or greater than about seventy percent (70%) of the pixel size, or greater than about eighty percent (80%) of the pixel size, or greater than about ninety percent (90%) of the pixel size, and that is less than about one hundred eighty percent (180%) of the pixel size, or less than about one hundred sixty percent (160%) of the pixel size, or less than about one hundred forty (140%) of the pixel size, or less than about one hundred twenty percent (120%) of the pixel size. For example, by 'comparable size', the unilateral diffractive element size may be between about seventy-five percent (75%) and about one hundred fifty (150%) of the pixel size. In another example, the unilateral diffractive element 220 may be comparable in size to the pixel where the unilateral diffractive element size is between about one hundred twenty-five percent (125%) and about eighty-five percent (85%) of the pixel size. According to some embodiments, the comparable sizes of the unilateral diffractive element 220 and the pixel may be chosen to reduce, or in some examples to minimize, dark zones between views of the unilateral multiview display 200. Moreover, the comparable sizes of the unilateral diffractive element 220 and the pixel may be chosen to reduce, and in some examples to minimize, an overlap between views (or view pixels) of the unilateral multiview display 200.

As illustrated in FIGS. 4A-4C, the unilateral multiview display 200 further comprises an array of light valves 230. The array of light valves 230 is configured to modulate the directional light beams 202 of the directional light beam plurality. As illustrated in FIGS. 4A-4C, different ones of the directional light beams 202 having different principal angular directions pass through and may be modulated by different ones of the light valves 230 in the light valve array.

Further, as illustrated, a light valve 230 of the array corresponds to a pixel of a multiview pixel 206, and a set of the light valves 230 corresponds to the multiview pixel 206 of the unilateral multiview display 200. In particular, a different set of light valves 230 of the light valve array is configured to receive and modulate the directional light beams 202 from a corresponding different one of the unilateral diffractive elements 220, i.e., there is one unique set of light valves 230 for each unilateral diffractive element 220, as illustrated. In various embodiments, different types of light valves may be employed as the light valves 230 of the light valve array including, but not limited to, one or more of liquid crystal light valves, electrophoretic light valves, and light valves based on electrowetting.

As illustrated in FIG. 4A, a first light valve set 230a is configured to receive and modulate the directional light beams 202 from a first unilateral diffractive element 220a. Further, a second light valve set 230b is configured to receive and modulate the directional light beams 202 from a second unilateral diffractive element 220b. Thus, each of the light valve sets (e.g., the first and second light valve sets 230a, 230b) in the light valve array corresponds, respectively, both to a different unilateral diffractive element 220 (e.g., elements 220a, 220b) and also to a different multiview pixel 206, with individual light valves 230 of the light valve sets corresponding to the pixels of the respective multiview pixels 206, as illustrated in FIG. 4A.

Note that, as illustrated in FIG. 4A, the size of a pixel of a multiview pixel 206 may correspond to a size of a light valve 230 in the light valve array. In other examples, the pixel size may be defined as a distance (e.g., a center-to-center distance) between adjacent light valves 230 of the light valve array. For example, the light valves 230 may be smaller than the center-to-center distance between the light valves 230 in the light valve array. The pixel size may be defined as either the size of the light valve 230 or a size corresponding to the center-to-center distance between the light valves 230, for example.

In some embodiments, a relationship between the unilateral diffractive elements 220 and corresponding multiview pixels 206 (i.e., sets of pixels and corresponding sets of light valves 230) may be a one-to-one relationship. That is, there may be an equal number of multiview pixels 206 and unilateral diffractive elements 220. FIG. 4B explicitly illustrates by way of example the one-to-one relationship where each multiview pixel 206 comprising a different set of light valves 230 (and corresponding pixels) is illustrated as surrounded by a dashed line. In other embodiments (not illustrated), the number of multiview pixels 206 and the number of unilateral diffractive elements 120 may differ from one another.

In some embodiments, an inter-element distance (e.g., center-to-center distance) between a pair of unilateral diffractive elements 220 may be equal to an inter-pixel distance (e.g., a center-to-center distance) between a corresponding pair of multiview pixels 206, e.g., represented by light valve sets. For example, as illustrated in FIG. 4A, a center-to-center distance d between the first unilateral diffractive element 220a and the second unilateral diffractive element 220b is substantially equal to a center-to-center distance D between the first light valve set 230a and the second light valve set 230b. In other embodiments (not illustrated), the relative center-to-center distances of pairs of unilateral diffractive elements 220 and corresponding light valve sets may differ, e.g., the unilateral diffractive elements 220 may have an inter-element spacing (i.e., center-to-center distance d) that is one of greater than or less than a spacing (i.e., center-to-center distance D) between light valve sets representing multiview pixels 206.

In some embodiments, a shape of the unilateral diffractive element 120 is analogous to a shape of the multiview pixel 206 or equivalently, to a shape of a set (or 'sub-array') of the light valves 230 corresponding to the multiview pixel 206. For example, the unilateral diffractive element 220 may have a square shape and the multiview pixel 206 (or an arrangement of a corresponding set of light valves 230) may be substantially square. In another example, the unilateral diffractive element 220 may have a rectangular shape, i.e., may have a length or longitudinal dimension that is greater than a width or transverse dimension. In this example, the multiview pixel 206 (or equivalently the arrangement of the set of light valves 230) corresponding to the unilateral diffractive element 220 may have an analogous rectangular shape. FIG. 4B illustrates a top or plan view of square-shaped unilateral diffractive elements 220 and corresponding square-shaped multiview pixels 206 comprising square sets of light valves 230. In yet other examples (not illustrated), the unilateral diffractive elements 220 and the corresponding multiview pixels 206 have various shapes including or at least approximated by, but not limited to, a triangular shape, a hexagonal shape, and a circular shape.

Further (e.g., as illustrated in FIG. 4A), each unilateral diffractive element 220 is configured to provide directional light beams 202 to one and only one multiview pixel 206, according to some embodiments. In particular, for a given one of the unilateral diffractive elements 220, the directional light beams 202 having different principal angular directions corresponding to the different views of the unilateral multiview display 200 are substantially confined to a single corresponding multiview pixel 206 and the pixels thereof, i.e., a single set of light valves 230 corresponding to the unilateral diffractive element 220, as illustrated in FIG. 4A. As such, each unilateral diffractive element 220 of the unilateral multiview display 200 provides a corresponding set of directional light beams 202 that has a set of the different principal angular directions corresponding to the different views of the unilateral multiview display 200 (i.e., the set of directional light beams 202 contains a light beam having a direction corresponding to each of the different view directions).

According to some embodiments, diffractive features of the slanted diffraction grating 122, 222 of the unilateral diffractive element array in either the unilateral backlight 100 or the unilateral multiview display 200 may comprise one or both of slanted grooves and slanted ridges that are spaced apart from one another. The slanted grooves or the slanted ridges may comprise a material of the light guide 110, e.g., may be formed in a surface of the light guide 110. In another example, the slanted grooves or the slanted ridges may be formed from a material other than the light guide material, e.g., a film or a layer of another material on a surface of the light guide 110.

In some embodiments, a slanted diffraction grating 122, 222 is a uniform diffraction grating in which the diffractive feature spacing is substantially constant or unvarying throughout the slanted diffraction grating 122. In other embodiments, the slanted diffraction grating 122 is a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed. Further, the slant angle of the slanted diffraction grating 122 may vary across, a length, a width, or an extent of the slanted diffraction grating 122. In some embodiments, the slanted diffraction grating 122, 222 may comprise a plurality of sub-gratings, each sub-grating being a slanted diffraction grating.

Referring again to FIG. 3, the unilateral backlight 100 may further comprise a light source 130. Similarly, the unilateral multiview display 200 illustrated in FIGS. 4A-4C may further comprise a light source 240. As illustrated, the light source 130, 240 is configured to provide the light to be guided within light guide 110, 210. In particular, the light source 130, 240 may be located adjacent to an entrance surface or end (input end) of the light guide 110, 210.

In various embodiments, the light source 130, 240 may comprise substantially any source of light (e.g., optical emitter) including, but not limited to, a light emitting diode (LED), a laser (e.g., laser diode) or a combination thereof. In some embodiments, the light source 130, 240 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 130, 240 may be a substantially broadband light source configured to provide substantially broadband or polychromatic light. For example, the light source 130, 240 may provide white light. In some embodiments, the light source 130, 240 may comprise a plurality of different optical emitters configured to provide different colors of light. The different optical emitters may be configured to provide light having different, color-specific, non-zero propagation angles of the guided light corresponding to each of the different colors of light. According to various embodiments, diffractive feature spacing and other diffraction grating characteristics (e.g., diffractive period) as well as grating orientation relative to a propagation direction of the guided light 104, 204 may correspond to the different colors of light. In other words, a unilateral diffractive element 120 may comprise different slanted diffraction gratings 122 that may be tailored to different colors of the guided light 104, for example. Likewise, the unilateral diffractive element 220 of the unilateral multiview display 200 may comprise a plurality of slanted gratings that are individually tailored to different colors of the guided light 204.

In some embodiments, the light source 130, 240 may further comprise a collimator. The collimator may be configured to receive substantially uncollimated light from one or more of the optical emitters of the light source 130, 240. The collimator is further configured to convert the substantially uncollimated light into collimated light. In particular, the collimator may provide collimated light one or both of having the non-zero propagation angle and being collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 110, 210 to propagate as the guided light 104, 204, described above.

In some embodiments, the unilateral backlight 100 may be configured to be substantially transparent to light in a direction through the light guide 110 orthogonal to (or substantially orthogonal) to a propagation direction 103 of the guided light 104. In particular, the light guide 110 and the spaced apart unilateral diffractive elements 120 allow light to pass through the light guide 110 through both the first surface 110' and the second surface 110", in some embodiments. Transparency may be facilitated, at least in part, due to both the relatively small size of the unilateral diffractive elements 120 and a relative larger inter-element spacing of the unilateral diffractive elements 120, in some embodiments. Further, the slanted diffraction gratings 122 of the unilateral diffractive elements 120 may also be substantially transparent to light propagating orthogonal to the light guide surfaces 110', 110", according to some embodiments. A combination of the light guide 210 and array of unilateral diffractive elements 220 of the unilateral multiview display 200 may be similarly configured to be transparent to light in the direction orthogonal to (or substantially orthogonal) to a propagation direction of the guided light 204, for example.

Figure 5:
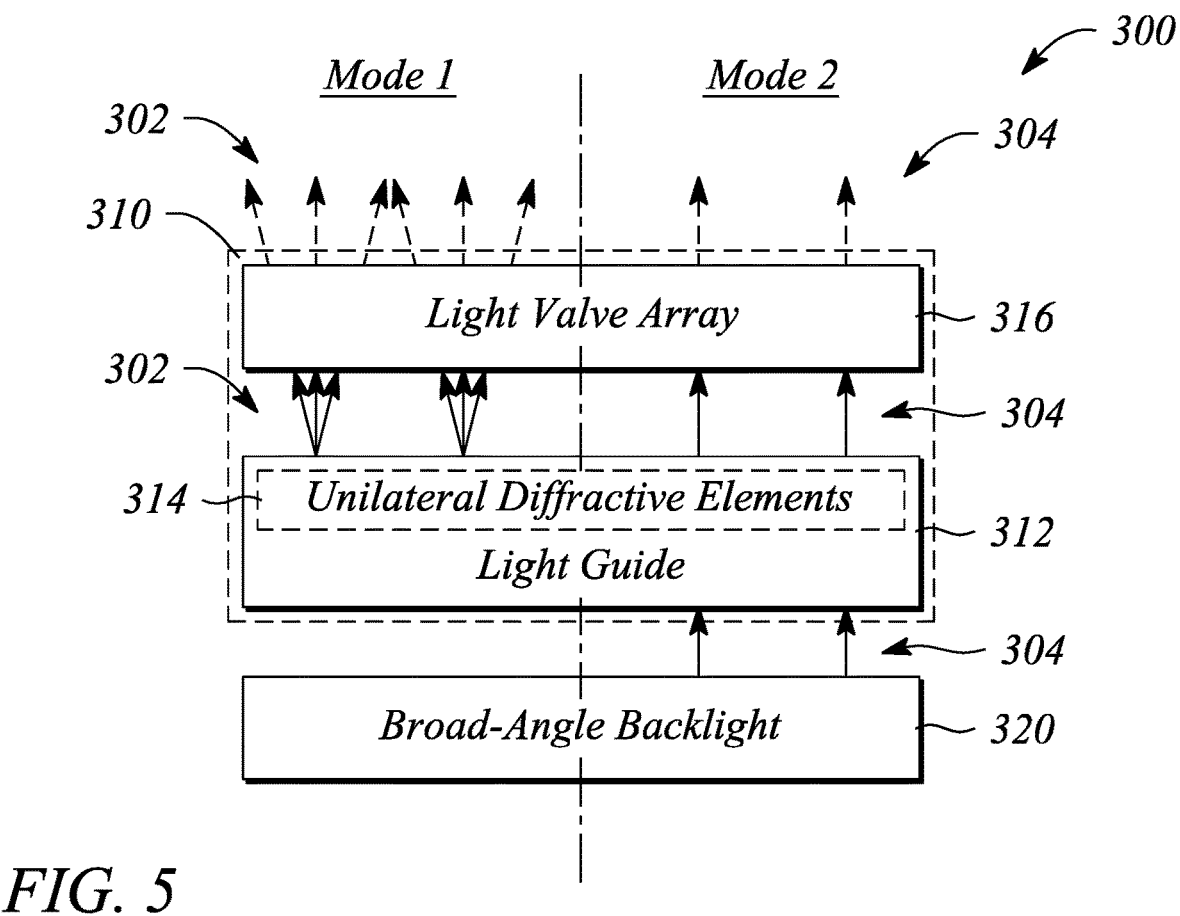
FIG. 5 illustrates a block diagram of a dual-mode display in an example, according to an embodiment consistent with the principles described herein.

In accordance with some embodiments of the principles described herein, a dual-mode display is provided. According to various embodiments, the dual-mode display is configured to provide a multiview image during a first mode and to provide a displayed image comprising a single view (e.g., a 2D image) during a second mode. FIG. 5 illustrates a block diagram of a dual-mode display 300 in an example, according to an embodiment consistent with the principles described herein. Operation of the dual-mode display 300 in the first mode (Mode 1) is illustrated in a left half of FIG. 5, while a right half illustrates operation in the second mode (Mode 2).

The dual-mode display 300 illustrated in FIG. 5 comprises a unilateral multiview display 310 configured to provide the multiview image during the first mode (Mode 1). As illustrated, the unilateral multiview display 310 comprises a light guide 312 and an array of unilateral diffractive elements 314. Unilateral diffractive elements 314 of the unilateral diffractive element array each comprise one or more slanted diffraction gratings. During the first mode, the array of unilateral diffractive elements 314 is configured to provide a plurality of directional light beams having directions corresponding to view directions of the multiview image by diffractively scattering out light guided in the light guide 312. In some embodiments, the unilateral multiview display 310 may be substantially similar to the unilateral multiview display 200, described above. In particular, the light guide 312 may be substantially similar to the light guide 210 and the array of unilateral diffractive elements may be substantially similar to the array of unilateral diffractive elements 220, described above with respect to the unilateral multiview display 200.

Further, the unilateral multiview display 310 comprises an array of light valves 316 configured to modulate directional light beams of the directional light beam plurality as the multiview image. According to some embodiments, the array of light valves 316 may be substantially similar to the array of light valves 230 of the above-described unilateral multiview display 200. In particular, modulated directional light beams 302 emitted by the unilateral multiview display 310 are used to display the multiview image and may correspond to pixels of the different views (i.e., view pixels). The modulated light beams 302 are illustrated as directional arrows emanating from the unilateral multiview display 310 in FIG. 5.

As illustrated in FIG. 5, the dual-mode display 300 further comprises a broad-angle backlight 320 configured to provide broad-angle light 304 during a second mode (Mode 2). In FIG. 5, the broad-angle backlight 320 is illustrated adjacent to a surface (e.g., a back surface) of unilateral multiview display 310 such that the light guide 312 and array of unilateral diffractive elements 314 are located between the broad-angle backlight 320 and the array of light valve 316. According to various embodiments, the array of light valves 316 is configured to modulate the broad-angle light 304 during the second mode to provide the displayed image having the single view. In particular, the array of light valves 316 are configured to modulate the broad-angle light 304 after the broad-angle light 304 has passed through the light guide 312 and array of unilateral diffractive elements 314 (e.g., as illustrated in the right half of FIG. 5). As such, the light guide 312 and array of unilateral diffractive elements 314 are transparent to the broad-angle light 304, according to various embodiments. Further, light valves 316 of the light valve array of the unilateral multiview display 310 are configured to provide modulation that results in both the multiview image during the first mode and the displayed image during the second mode, according to various embodiments.

Figure 6:
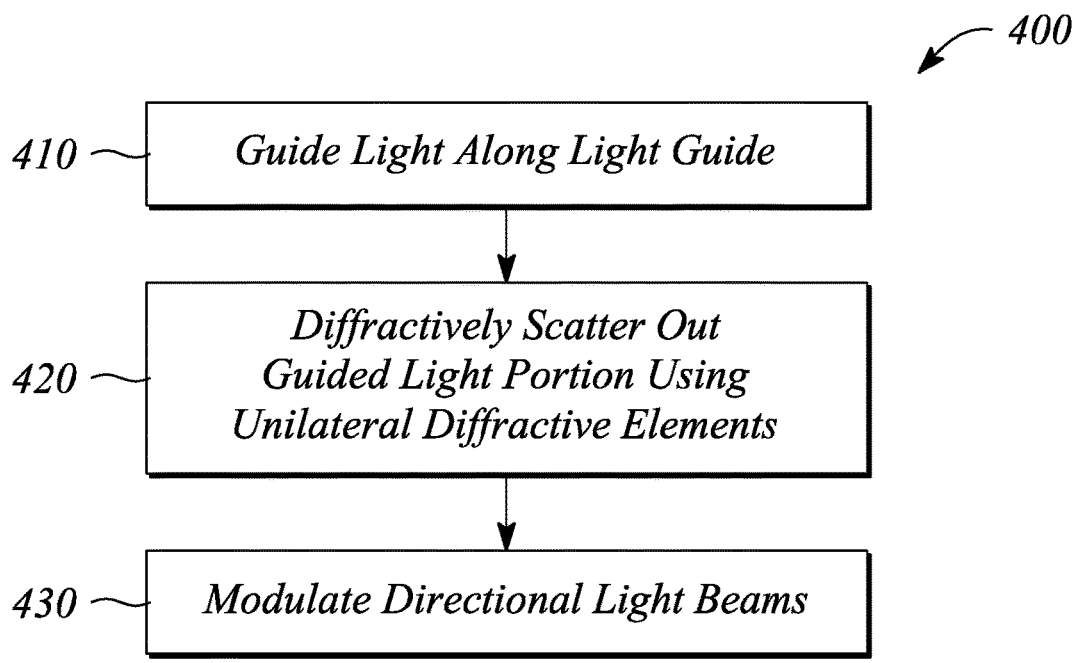
FIG. 6 illustrates a flow chart of a method of unilateral backlight operation in an example, according to an embodiment consistent with the principles described herein.

In accordance with other embodiments of the principles described herein, a method of unilateral backlight operation is provided. FIG. 6 illustrates a flow chart of a method 400 of unilateral backlight operation in an example, according to an embodiment consistent with the principles described herein. As illustrated in FIG. 6, the method 400 of unilateral backlight operation comprises guiding 410 light along a length of a light guide. In some embodiments, the light may be guided 410 at a non-zero propagation angle. In some embodiments, the guided light may be collimated, e.g., collimated according to a predetermined collimation factor. According to some embodiments, the light guide may be substantially similar to the light guide 110 described above with respect to the unilateral backlight 100. In particular, the light may be guided according to total internal reflection within the light guide, according to various embodiments. As illustrated in FIG. 6, the method 400 of unilateral backlight operation further comprises diffractively scattering out 420 a portion of the guided light from the light guide using an array of unilateral diffractive elements to provide a plurality of directional light beams having a unilateral direction. According to various embodiments, a unilateral diffractive element of the plurality of unilateral diffractive elements comprises a slanted diffraction grating. In some embodiments, the unilateral diffractive element array may be substantially similar to the array of unilateral diffractive elements 120 of the unilateral backlight 100, described above. In particular, the slanted diffraction grating that may be substantially similar to the slanted diffraction grating 122, described above.

In some embodiments, the unilateral diffractive element of the array of unilateral diffractive elements provides a plurality of directional light beams having different principal angular directions in the unilateral direction. Further, the different principal angular directions may correspond to respective view directions of a multiview display, in some embodiments. Further, a size of the unilateral diffractive element may be comparable to a size of a pixel in a multiview pixel of the multiview display. For example, the unilateral diffractive element size may be greater than one half of the pixel size and less than twice the pixel size. Further, a unilateral diffractive element of the array may comprise a plurality of slanted diffraction gratings, according to various embodiments. As such, the unilateral diffractive element may be a unilateral multibeam element, in some embodiments.

In some embodiments (not illustrated), the method 400 of unilateral backlight operation further comprises providing light to the light guide using a light source. The provided light one or both of may have a non-zero propagation angle within the light guide and may be collimated within the light guide according to a collimation factor to provide a predetermined angular spread of the guided light within the light guide. In some embodiments, the light source may be substantially similar to the light source 130 of the unilateral backlight 100, described above.

In some embodiments, the method 400 of unilateral backlight operation further comprises modulating 430 the plurality of directional light beams using a plurality of light valves to display an image in the unilateral direction. In some embodiments, the plurality of light valves may be substantially similar to the array of light valves 230 described above with respect to the unilateral multiview display 200. In particular, according to some embodiments, a light valve of a plurality of light valves may correspond to a pixel of a multiview pixel. That is, the light valve may have a size comparable to a size of the pixel or a size comparable to a center-to-center spacing between the pixels of the multiview pixel, for example. Further, different sets of light valves may correspond to different multiview pixels in a manner similar to the correspondence of the first and second light valve sets 230a, 230b to different multiview pixels 206, as described above.

Thus, there have been described examples and embodiments of a unilateral backlight, a method of unilateral backlight operation, and a unilateral multiview display that employ unilateral diffractive elements employing slanted diffraction gratings. It should be understood that the above-described examples are merely illustrative of some of the many specific examples that represent the principles described herein. Clearly, those skilled in the art can readily devise numerous other arrangements without departing from the scope as defined by the following claims.

What is claimed is:
1. A unilateral backlight comprising:
a light guide configured to guide light in a propagation direction along a length of the light guide; and
an array of unilateral diffractive elements spaced apart from one another along the light guide length, a unilateral diffractive element of the array of unilateral diffractive elements comprising a slanted diffraction grating configured to scatter out from the light guide a portion of the guided light as a directional light beam having a unilateral direction,
wherein the unilateral diffractive element is configured to scatter out the portion of the guided light as a plurality of directional light beams having different principal angular directions in the unilateral direction corresponding to respective different view directions of a unilateral multiview display, a size of the unilateral diffractive element being between fifty percent and two hundred percent of a pixel size of a pixel in a multiview pixel of the unilateral multiview display.

2. The unilateral backlight of claim 1, wherein a slant angle of the slanted diffraction grating is between thirty degrees and sixty degrees relative a surface normal of the light guide.

3. The unilateral backlight of claim 1, wherein the slanted diffraction grating comprises a plurality of sub-gratings, each sub-grating being a slanted diffraction grating.

4. The unilateral backlight of claim 1, wherein a shape of the unilateral diffractive element is analogous to a shape of the multiview pixel.

5. The unilateral backlight of claim 1, wherein the unilateral diffractive element is located one of at a first surface and at a second surface of the light guide, the unilateral diffractive element being configured to scatter out the portion of the guided light through the first surface in the unilateral direction.

6. The unilateral backlight of claim 1, further comprising a light source optically coupled to an input of the light guide, the light source being configured to provide the light to the light guide, the guided light being collimated according to a predetermined collimation factor.

7. The unilateral backlight of claim 1, wherein a combination of the light guide and the unilateral diffractive element array is configured to be optically transparent in a direction orthogonal to the propagation direction of the guided light.

8. A display comprising the unilateral backlight of claim 1, the display further comprising an array of light valves configured to modulate a plurality of directional light beams scattered out by the array of unilateral diffractive elements as a displayed image.

9. The display of claim 8, wherein unilateral diffractive elements of the unilateral diffractive element array are configured as unilateral multibeam elements to scatter out the portion of the guided light as a plurality of directional light beams having different principal angular directions in the unilateral direction corresponding to respective view directions of a multiview display, the display image being a multiview image.

10. A unilateral multiview display comprising:
   a light guide configured to guide light along a length of the light guide as guided light;
   an array of unilateral multibeam elements spaced apart from one another along the light guide length, a unilateral multibeam element of the array of multibeam elements comprising a slanted diffraction grating configured to scatter out a portion of the guided light in a unilateral direction as a plurality of directional light beams having principal angular directions corresponding to respective view directions of a multiview image;
   an array of light valves configured to modulate the plurality of directional light beams as the multiview; and
   a broad-angle backlight configured to provide broad-angle light during a second mode, the light guide and array of unilateral multibeam elements being between the broad-angle backlight and the array of light valves, wherein the array of light valves is configured to modulate the plurality of directional light beams as the multiview image during a first mode and the array of light valves is configured to modulate the broad-angle light during the second mode to provide a displayed image having a single view.

11. The unilateral multiview display of claim 10, wherein a size of the unilateral multibeam element is greater than one half of a size of a light valve in the array of light valves and less than twice the light valve size.

12. The unilateral multiview display of claim 10, wherein a shape of the unilateral multibeam element is analogous to a shape of a set of light valves representing a multiview pixel of the multiview display.

13. The unilateral multiview display of claim 10, wherein the slanted diffractive grating has a slant angle between thirty degrees and sixty degrees relative a surface normal of the light guide.

14. The unilateral multiview display of claim 10, further comprising a light source configured to provide the light to the light guide, the guided light being collimated according to a collimation factor to provide a predetermined angular spread of the guided light within the light guide.

15. A method of unilateral backlight operation, the method comprising:
   guiding light in a propagation direction along a length of a light guide; and
   diffractively scattering a portion of the guided light out of the light guide using an array of unilateral diffractive elements spaced apart from one another along the light guide length to provide a plurality of directional light beams having a unilateral direction,
   wherein a unilateral diffractive element of the array of unilateral diffractive elements comprises a slanted diffraction grating, and
   wherein a unilateral diffractive element of the array of unilateral diffractive elements provides a plurality of directional light beams having different principal angular directions in the unilateral direction, the different principal angular directions corresponding to respective view directions of a multiview display, a size of the unilateral diffractive element being between fifty percent and two hundred percent of a pixel size of a pixel in a multiview pixel of a unilateral multiview display.

16. The method of unilateral backlight operation of claim 15, further comprising modulating the plurality directional light beams using a plurality of light valves to display an image in the unilateral direction.

17. The method of unilateral backlight operation of claim 16, further comprising:
   providing the plurality of directional light beams during a first mode by a unilateral backlight that comprises the light guide; and
   providing broad-angle light during a second mode by a broad-angle backlight, the light guide and array of unilateral diffractive elements being between the broad-angle backlight and the array of light valves, wherein the array of light valves is configured to modulate the plurality of directional light beams as a multiview image during the first mode and the array of light valves is configured to modulate the broad-angle light as a single view image during the second mode.

18. The unilateral backlight of claim 1, wherein a dual-mode display comprises the unilateral backlight, the dual-mode display further comprising a broad-angle backlight configured to provide broad-angle light during a second mode, the light guide and array of unilateral multibeam elements being between the broad-angle backlight and the array of light valves, wherein an array of light valves is configured to modulate the plurality of directional light beams as the multiview image during a first mode and the array of light valves is configured to modulate the broad-angle light during the second mode to provide a displayed image having a single view.

* * * * *